US012566451B2

(12) United States Patent     (10) Patent No.:   US 12,566,451 B2

Wise et al.     (45) Date of Patent:     Mar. 3, 2026

(54) INTERACTIVE DETECTION OF OBSTACLE STATUS IN MOBILE ROBOTS

(71) Applicant: ZEBRA TECHNOLOGIES CORPORATION, Lincolnshire, IL (US)

(72) Inventors: Melonee Wise, San Jose, CA (US); Aaron Hoy, San Jose, CA (US); Derek King, Seattle, WA (US); Micaela Angeli, Lincolnshire, IL (US); Chinmay Shah, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 281 days.

(21) Appl. No.: 17/970,366

(22) Filed: Oct. 20, 2022

(65) Prior Publication Data

US 2024/0131735 A1     Apr. 25, 2024
US 2024/0227215 A9     Jul. 11, 2024

(51) Int. Cl.
    G05D 1/622     (2024.01)

(52) U.S. Cl.
    CPC ................................... G05D 1/622 (2024.01)

(58) Field of Classification Search
    CPC .... G05D 1/622; G05D 1/0214; G05D 1/0246; G05D 1/0044; G05D 1/0238; G05D 2109/10; G05D 1/646; G05D 1/633; G05D 2107/60; G05D 2107/70; G05D 2107/40; B25J 9/1666; B25J 9/1676; B25J 9/1664; B25J 11/0085; B25J 19/021; B25J 5/00; B25J 5/007; A47L 2201/04; G05B 19/4061; B60W 2050/146; B60W 2540/215; B60W 2554/00
    See application file for complete search history.

(56) References Cited

U.S. PATENT DOCUMENTS

| | | | | |
|---|---|---|---|---|
| 11,226,633 B2 * | 1/2022 | Kim | ......................... | B25J 11/00 |
| 2021/0089040 A1 * | 3/2021 | Ebrahimi Afrouzi | ....................... | |
| | | | | A47L 9/2873 |
| 2022/0104675 A1 * | 4/2022 | Schneider | ........... | A47L 11/4011 |

(Continued)

FOREIGN PATENT DOCUMENTS

| | | | | |
|---|---|---|---|---|
| CN | 112327854 A * | 2/2021 | ............... | G05D 1/02 |
| JP | 2020507164 A * | 3/2020 | ............... | G05D 1/02 |
| WO | 2022170279 A1 | 8/2022 | | |

OTHER PUBLICATIONS

International Search Report and Written Opinion for International Application No. PCT/US2023/34526 mailed on Jan. 8, 2024.

*Primary Examiner* — Abby Lin
*Assistant Examiner* — Kayla R Doros

(57)       ABSTRACT

A method includes: at a mobile robot, travelling according to a current path; using a sensor of the mobile robot, capturing sensor data representing a vicinity of the mobile robot; detecting, based on the sensor data, an obstacle obstructing the current path; in response to detecting the obstacle, outputting a request for a status change corresponding to the obstacle; receiving at the mobile robot, in response to the request for a status change, data defining an updated status of the obstacle; selecting, based on the updated status data, a navigational action between (i) continuing to travel according to the current path and (ii) generating a new path circumventing the obstacle; and executing the selected navigational action.

26 Claims, 9 Drawing Sheets

(56) References Cited

U.S. PATENT DOCUMENTS

| | | | |
|---|---|---|---|
| 2022/0119196 A1* | 4/2022 | Cesic | G06V 20/10 |
| 2022/0147747 A1* | 5/2022 | Arandorenko | G06T 7/50 |
| 2022/0197294 A1* | 6/2022 | Huang | G05D 1/0217 |

* cited by examiner

INTERACTIVE DETECTION OF OBSTACLE STATUS IN MOBILE ROBOTS

BACKGROUND

Autonomous or semi-autonomous mobile robots can be deployed in facilities such as warehouses, manufacturing facilities, healthcare facilities, or the like, e.g., to transport items within the relevant facility. While navigating a facility, a mobile robot may detect obstacles in its path. Replanning the path to avoid the obstacle, e.g., by travelling through a different portion of the facility, may be computationally costly and/or time-consuming.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
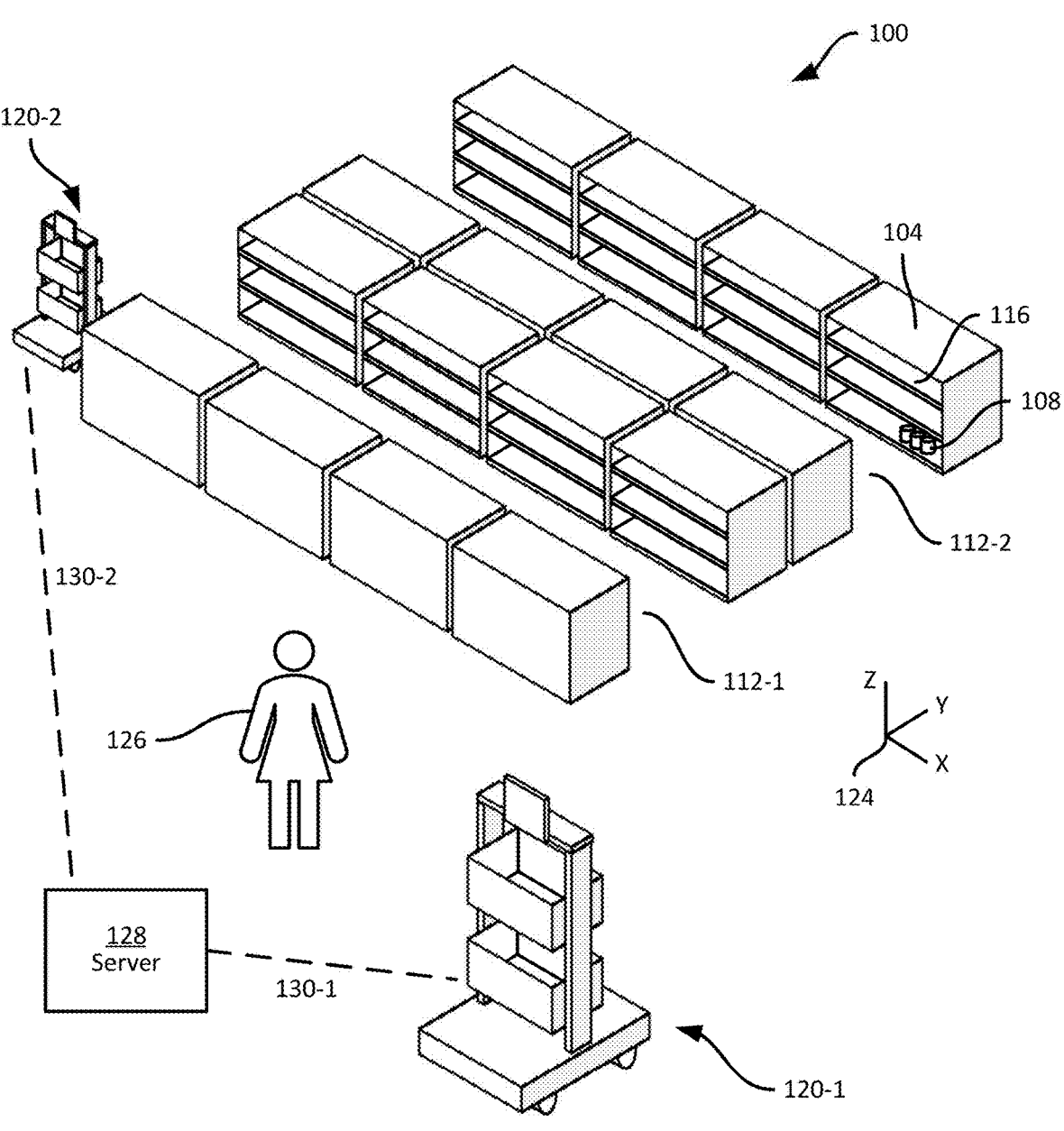
FIG. 1 is a diagram of item-handing mobile robots deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, including: capturing sensor data representing a vicinity of a mobile robot; detecting, based on the sensor data, an obstacle obstructing a current path of the mobile robot; in response to detecting the obstacle, outputting a request for a status change corresponding to the obstacle; receiving, in response to the request for the status change, data defining an updated status of the obstacle; selecting, based on the updated status data, a navigational action between (i) continuing to travel according to the current path and (ii) generating a new path circumventing the obstacle; and executing the selected navigational action.

Additional examples disclosed herein are directed to a mobile robot, including: a locomotive assembly; an output device; and a processor configured to: control the locomotive assembly to travel according to a current path; capture sensor data representing a vicinity of the mobile robot; detect, based on the sensor data, an obstacle obstructing the current path; in response to detecting the obstacle, control the output device to present a request for a status change corresponding to the obstacle; receive, in response to the request for the status change, data defining an updated status of the obstacle; select, based on the updated status data, a navigational action between (i) continuing to travel according to the current path and (ii) generating a new path circumventing the obstacle; and execute the selected navigational action.

FIG. 1 illustrates an interior of a facility 100, such as a warehouse, a manufacturing facility, a healthcare facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility 100 can include fewer aisles 112 than shown, or more aisles 112 than shown in FIG. 1. The aisle 112, in the illustrated example, are formed by sets of eight support structures 104 (four on each side). The facility can also have a wide variety of other aisle layouts, however. As will be apparent, each aisle 112 is a space open at the ends, and bounded on either side by a support structure 104. The aisle 112 can be travelled by humans, vehicles, and the like. In still further examples, the facility 100 need not include aisles 112, and can instead include assembly lines, or the like.

The items 108 may be handled according to a wide variety of processes, depending on the nature of the facility. In some examples, the facility is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by mobile robots, of which two example robots 120-1 and 120-2 are shown in FIG. 1. A greater number of robots 120 can be deployed in the facility 100 than the two robots 120 shown in FIG. 1, for example based on the size and/or layout of the facility 100. Components of the robots 120 are discussed below in greater detail. In general, each robot 120 is configured to transport items 108 within the facility 100.

Each robot 120 can be configured to track its pose (e.g., location and orientation) within the facility 100, e.g., within a coordinate system 124 previously established in the facility 100. The robots 120 can navigate autonomously within the facility 100, e.g., travelling to locations assigned to the robots 120 to receive and/or deposit items 108. The items 108 can be deposited into or onto the robots 120, and removed from the robots 120, by one or more human workers 126 and/or mechanized equipment such as robotic arms and the like deployed in the facility 100. The locations to which each robot 120 navigates can be assigned to the robots 120 by a central server 128. That is, the server 128 is configured to assign tasks to the robots 120. Each task can include either or both of one or more locations to travel to, and one or more actions to perform at those locations. For example, the server 128 can assign a task to the robot 120-1 to travel to a location defined in the coordinate system 124, and to await the receipt of one or more items 108 at that location.

Tasks can be assigned to the robots via the exchange of messages between the server 128 and the robots 120, e.g., over a suitable combination of local and wide-area network, including communications links 130-1 and 130-2. The server 128 can be deployed at the facility 100, or remotely from the facility 100. In some examples, the server 128 is configured to assign tasks to robots 120 at multiple facilities, and need not be physically located in any of the individual facilities.

In response to receiving a target location, e.g., from the server 128, a mobile robot 120 is configured to generate a path through the facility 100 from a current pose of the robot 120 to the target location. Generation of the path can be based on a map of the facility 100 stored at or otherwise accessible to the mobile robot 120 (e.g., by retrieval from the server 128). The mobile robot 120 is configured to travel along the generated path towards the target location.

Various objects in the facility 100, such as boxes, pallets, items 108, other robots 120, and humans (e.g., a worker 126) are generally not represented in the map mentioned above, because the locations of such objects in the facility 100 are typically transient. The robot 120 is therefore further configured to monitor its surroundings for obstacles while travelling the generated path. Upon detecting an obstacle that obstructs the current path, the robot 120 may generate a new path to the target location, avoiding the obstacle. The new path may, however, significantly lengthen the travel distance to the target location (e.g., by exiting an aisle 112 and travelling through a different aisle 112). The robot 120 can be configured to pause its travel for a predetermined timeout period before generating a new path, e.g., to determine if the obstacle has been removed, whether under its own power (e.g., in the case of the worker 126 or another robot 120) or by another entity (e.g., in the case of a box removed from the path of the robot 120 by the worker 126).

The timeout period mentioned above however, may lengthen the time consumed to arrive at the target location if, at the end of the timeout period, the obstacle remains in place and a new path is generated to circumvent the obstacle. In other scenarios, however, the robot 120 may generate a new path shortly before the obstacle is removed from the initial path, in which case the extended travel distance of the new path unnecessarily lengthens travel time to the target location.

The robot 120 is therefore also configured, as discussed below, to generate and output requests for obstacle status changes. The requests prompt nearby entities, such as the worker 126 and/or another mobile robot 120, to provide the mobile robot 120 with information on the current or expected presence of a detected obstacle, and in some cases to physically manipulate the obstacle, e.g., to remove the obstacle from the current path of the robot 120. By generating such requests and incorporating the status data collected as a result of the requests into the selection of a navigational action, the mobile robot 120 can improve navigational efficiency, e.g., bypassing timeout periods in some instances and extending timeout periods in other instances, to reduce total travel time to a target location.

Figure 2:
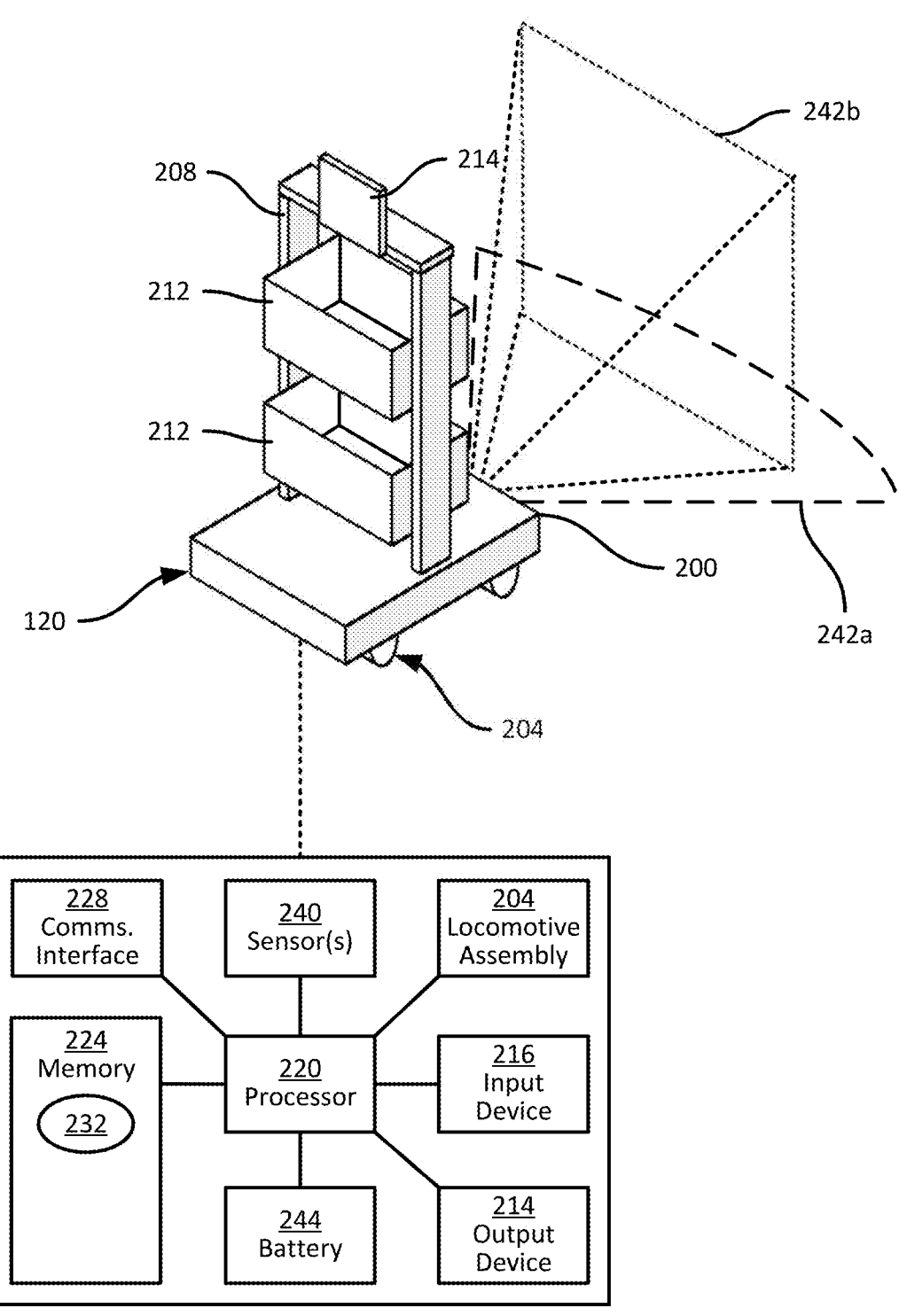
FIG. 2 is a diagram of certain components of a mobile robot of FIG. 1.

Before discussing the functionality implemented by the robots 120 in greater detail, certain components of the robots 120 are discussed with reference to FIG. 2. As shown in FIG. 2, each robot 120 includes a chassis 200 supporting various other components of the robot 120. In particular, the chassis 200 supports a locomotive assembly 204, which can include a motor, such as one or more electric motors (e.g., a brushless DC electric motor) driving an effector such as a set of wheels, tracks, or the like. The locomotive assembly 204 can include one or more sensors such as a wheel odometer, an inertial measurement unit (IMU), and the like. The locomotive assembly 204 can further include one or more braking devices, e.g., coupled to the effector(s).

The chassis 200 also supports receptacles, shelves, or the like, to support items 108 during transport. For example, the robot 120 can include a selectable combination of receptacles 212. In the illustrated example, the chassis 200 supports a rack 208, e.g., including rails or other structural features configured to support receptacles 212 at variable heights above the chassis 200. The receptacles 212 can therefore be installed and removed to and from the rack 208, enabling distinct combinations of receptacles 212 to be supported by the robot 120.

The robot 120 can also include an output device, such as a display 214. In the illustrated example, the display 214 is mounted above the rack 208, but it will be apparent that the display 214 can be disposed elsewhere on the robot 120 in other examples. The robot 120 can also include other output devices in addition to or instead of the display 214. For example, the robot 120 can include one or more speakers, light emitters such as strips of light-emitting diodes (LEDs) along the rack 208, and the like.

The robot 120 further includes an input device 216, such as a touch screen integrated with the display 214. The input device 216 can include other inputs in addition to or instead of the above-mentioned touch screen, such as a microphone, keypad, or the like, in other examples. The input device 216 is configured to receive input from an entity such as the worker 126, and provide data representing such input to a processor 220 of the mobile robot 120.

The chassis 200 of the robot 120 also supports various other components, including the processor 220, e.g., one or more CPUs, GPUs, or dedicated hardware controllers such as ASICs. The processor 220 is communicatively coupled with a non-transitory computer readable medium such as a memory 224, e.g., a suitable combination of volatile and non-volatile memory elements. The processor 220 is also coupled with a communications interface 228, such as a wireless transceiver enabling the robot 120 to communicate with other computing devices, such as the server 128 and other robots 120.

The memory 224 stores various data used for autonomous or semi-autonomous navigation, including an application 232 executable by the processor 220 to implement navigational and other task execution functions. In some examples, the above functions can be implemented via multiple distinct applications stored in the memory 224.

The chassis 200 can also support a sensor 240, such as one or more cameras and/or depth sensors (e.g., lidars, depth cameras, time-of-flight cameras, or the like) coupled with the processor 220. The sensor(s) 240 are configured to capture image and/or depth data depicting at least a portion of the physical environment of the robot 120. Data captured by the sensor(s) 240 can by used by the processor 220 for navigational purposes, e.g., path planning, obstacle avoidance, and the like, as well as for updating a map of the facility in some examples.

The sensors 240 have respective fields of view (FOVs). For example, a first FOV 242a corresponds to a laser scanner, such as a lidar sensor disposed on a forward-facing surface of the chassis 200. The FOV 242a can be substantially two-dimensional, e.g., extending forwards in a substantially horizontal plane. A second FOV 242b corresponds to a camera (e.g., a depth camera, a color camera, or the like) also mounted on the forward-facing surface of the chassis 200. As will be apparent, a wide variety of other optical sensors can be disposed on the chassis 200 and/or the rack 208, with respective FOVs 242.

The components of the robot 120 that consume electrical power can be supplied with such power from a battery 244, e.g., implemented as one or more rechargeable batteries housed in the chassis 200.

Figure 3:
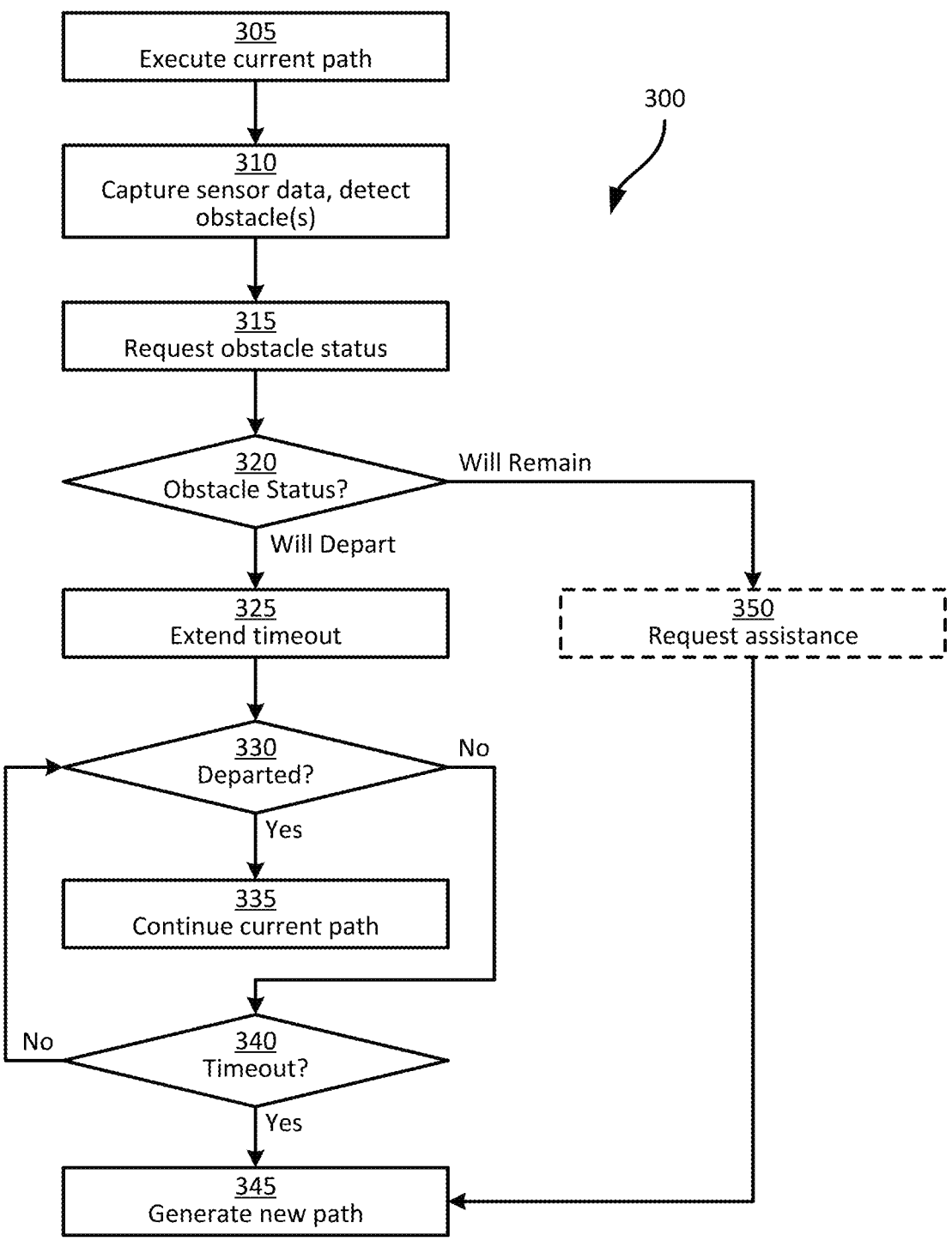
FIG. 3 is a flowchart illustrating a method of interactive obstacle status detection.

Turning to FIG. 3, a method 300 of interactive detection of obstacle status is illustrated. The method 300 is described below in conjunction with its example performance by a mobile robot 120, e.g., via execution of the application 232 by the processor 220.

At block 305, the mobile robot 120 is configured to execute a current path through the facility 100. The current path can be generated previously, e.g., in response to a command from the server 128 to travel to a target location in the facility 100. In response to generating the current path, the mobile robot 120 can control the locomotive assembly 204 to travel along the current path towards the target location.

While executing the current path, at block 310 the mobile robot 120 is configured to capture sensor data, e.g., by activating one or more of the sensors 240. For example, the processor 220 can capture image data, depth data (e.g., a point cloud), or the like representing the vicinity of the robot 120 within one or more of the FOVs 242 at any suitable frequency (e.g., 30 Hz) while travelling along the current path. From the sensor data, the processor 220 is configured to detect one or more obstacles obstructing the current path. As will be apparent, the mobile robot 120 may also detect obstacles in the sensor data that do not obstruct the current path, however any processing of those obstacles is beyond the scope of the present discussion.

An obstacle that obstructs the current path can be, for example, an obstacle that intersects with, or is within a threshold distance of, the current path, and is within a threshold distance of the mobile robot 120 itself. For instance, a worker 126 at an opposite end of an aisle may intersect the current path of the mobile robot 120, but be sufficient distant from the current pose of the mobile robot 120 that the worker 126 is not considered to obstruct the current path.

As will be apparent, when no obstacles are detected that obstruct the current path, the mobile robot 120 can continue along the current path, repeating the capture of sensor data periodically. The obstacles detected at block 310 (that is, those obstructing the current path) can include a wide variety of obstacles, including self-propelled obstacles such as the worker 126 or another mobile robot 120, and passive obstacles such as boxes, items 108, pallets, or the like. In some examples, the obstacles detected at block 310 can include previously observed obstacles whose observed locations intersect with the current path, but are no longer within the FOVs 242 of the mobile robot 120. Examples of each of the above-mentioned obstacle types are discussed further below.

Figure 4:
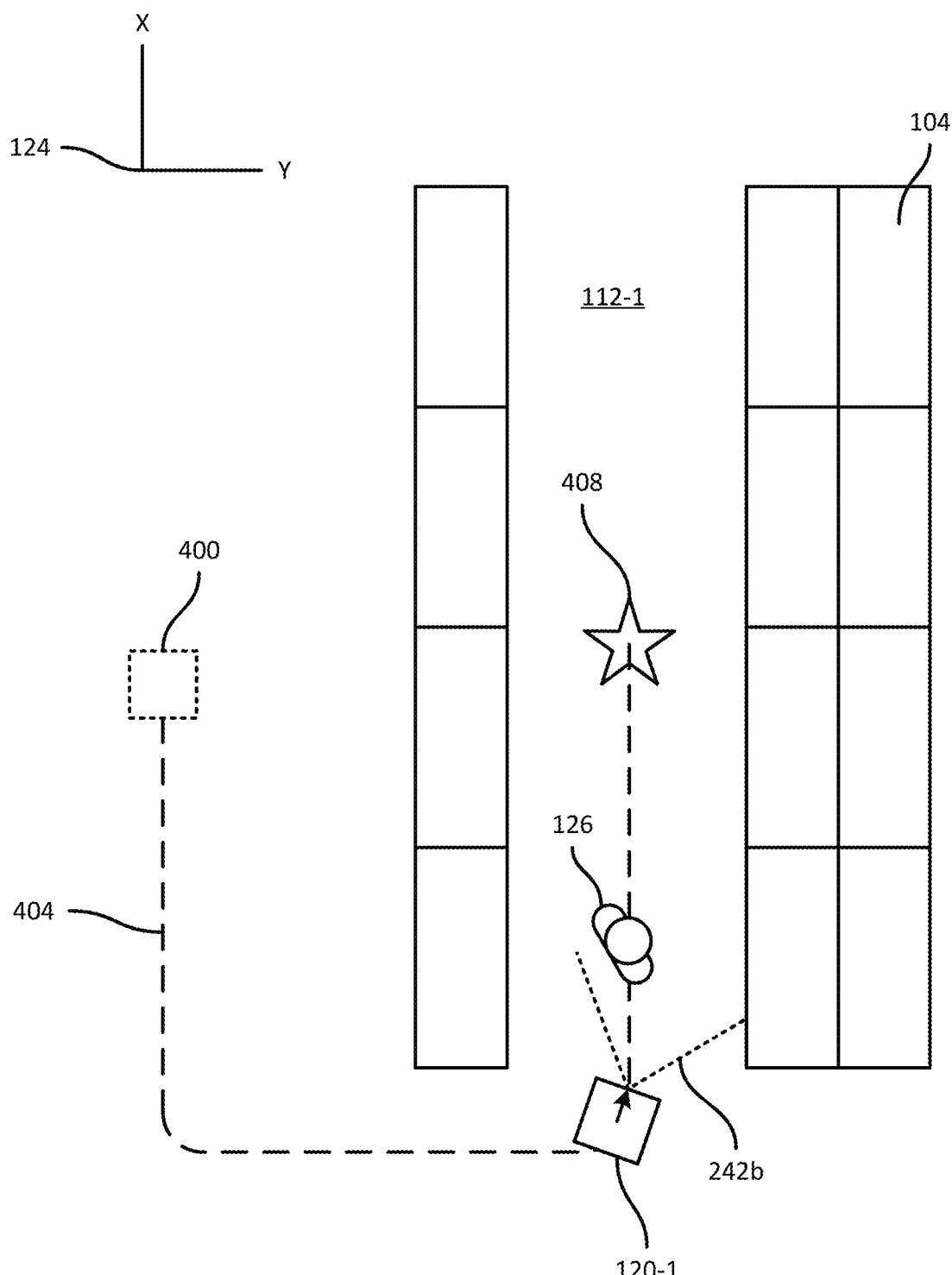
FIG. 4 is a diagram illustrating an example performance of blocks 305 and 310 of the method of FIG. 3.

Turning to FIG. 4, an example performance of blocks 305, 310, and 315 is illustrated. In particular, the mobile robot 120-1 is shown as having travelled from an initial pose 400 along a current path 404 towards a target location 408 in the aisle 112-1. As the robot 120-1 enters the aisle 112-1, the processor 220 detects an obstacle in the FOV 242b. In this example, the obstacle is a worker 126, and not only intersects the current path, but is close enough to the mobile robot 120-1 that the mobile robot 120-1 cannot continue on the current path 404. In other words, the worker 126 obstructs the current path 404.

Referring again to FIG. 3, at block 315, in response to detecting an obstacle obstructing the current path 404, the processor 220 is configured to generate and output a request for a status change corresponding to the obstacle detected at block 310. The nature of the request generated at block 315 is dependent on the nature of the obstacle at block 310, various examples of which are discussed further below. In general, the request initiates an interaction between the mobile robot 120 and either the obstacle itself or a nearby entity, to request any of a physical movement of the obstacle, an indication of expected movement of the obstacle, e.g., in the near future, or a confirmation of an obstacle's presence or absence. Through the interaction initiated by the request, the mobile robot 120 can therefore obtain updated status data from the obstacle or nearby entity that may not be derivable from the sensor data alone. Subsequent navigational actions can be selected based not only on the sensor data, but also on such update status data.

The processor 220 is configured to select among a plurality of request types at block 315 based on either or both of a type of the obstacle, and a current status of the obstacle. The type of the obstacle indicates, for example, whether the obstacle is passive (e.g., not capable of informational exchange with the robot 120) or self-propelled (e.g., capable of informational exchange with the robot 120). In some examples, more specific obstacle types can be detected at block 310, e.g., to distinguish between a worker 126 and another mobile robot 120 (both of which are self-propelled). The current status of the obstacle can include, for example, an indication of whether the obstacle is currently observed, or unobservable. An unobservable obstacle is an obstacle that was previously observed at a location that is currently outside the FOVs 242. In other words, the mobile robot 120 may not be able to confirm from the current sensor data whether an unobservable obstacle is still present at the previously observed location.

The processor 220 can therefore select, e.g., from a mapping stored in the memory 224 between request types and obstacle types and/or obstacle status, a type of request to generate at block 315. In the present example performance of the method 300, the obstacle detected at block 310 is the worker 126 shown in FIG. 4, and the processor 220 can therefore select a request corresponding to self-propelled obstacles. In some examples, the processor 220 can select a request corresponding to humans specifically, rather than any self-propelled obstacle (e.g., a separate request type, e.g., an electronic message exchange, can be employed for other self-propelled obstacles such as other mobile robots configured for electronic communication with the robot 120).

The request generated at block 315 in this example is a request directed to the obstacle itself (e.g., to the worker 126) to effect a status change. In the present example, the request generated at block 315 can include a request for the worker 126 to indicate an expected near-future state, e.g., whether the worker 126 intends to move away from their current position in a certain time period. The request, in other words, is a request for the worker 126 to vacate the current path of the mobile robot 120, and enables the worker 126 to indicate whether or not the requested movement will be performed.

Figure 5:
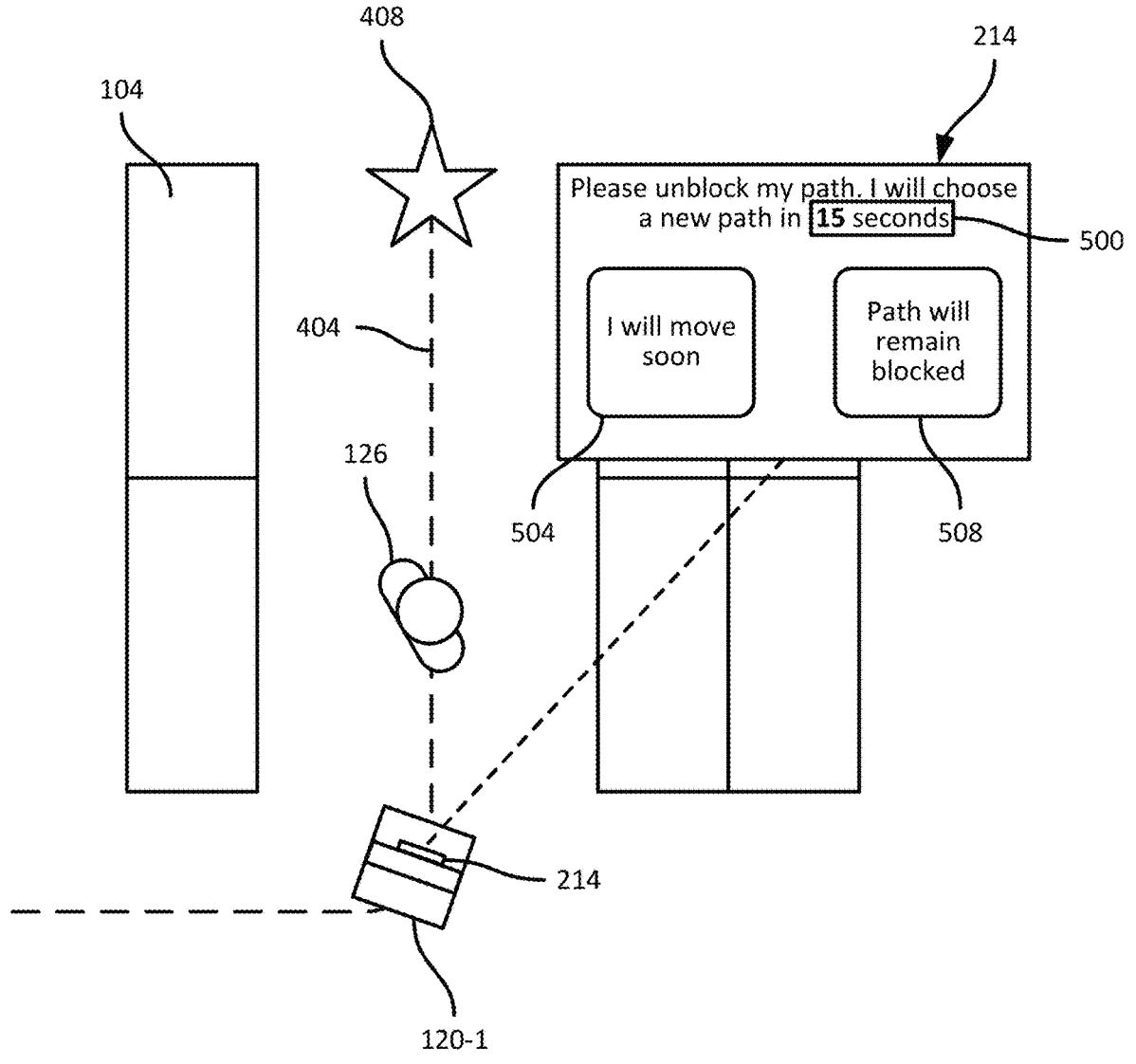
FIG. 5 is a diagram illustrating an example performance of block 315 of the method of FIG. 3.

FIG. 5 illustrates an example request rendered on the display 214 at block 315. The request can be presented via other output devices in addition to or instead of the display 214 in other examples, e.g., played via a speaker or the like. The request includes a message requesting that the worker 126 unblock the current path 404, and may indicate a default timeout period 500 after which the robot 120 will generate a new path to circumvent the worker 126 (e.g., via an adjacent aisle 112) if no response to the request is received. The request can also include selectable responses 504 and 508. The response 504 is selectable by the worker 126 to provide updated status data to the robot 120 indicating that the worker 126 expects to move out of the current path 404. The response 508 is selectable by the worker 126 to provide updated status data to the robot 120 indicating that the worker 126 expects to continue obstructing the current path at least beyond the timeout threshold.

The responses 504 and 508 are shown as being selectable, e.g., via a touch screen integrated with the display 214. In other examples, response data can also be received via a microphone (e.g., the worker 126 may provide voice responses), or other suitable input device.

In some examples, the request can indicate a threshold time for the worker 126 to evaluate in determining which response to select. For example, the request can indicate that the worker 126 should select the response 504 if they expect to move away within the next 30 seconds (e.g., twice the timeout period).

Returning to FIG. 3, at block 320, the processor 220 is configured to receive updated status data, e.g., in a response to the request generated at block 315. The data received at block 320 includes an updated status of the obstacle, such as an indication that the obstacle is expected to continue obstructing the current path, or an indication that the obstacle is expected to vacate the current path. The processor 220 is configured to select, based on the updated status data, a navigational action between continuing to travel according to the current path and generating a new path circumventing the obstacle.

In the present example, when the response 504 is selected by the worker 126, indicating that the worker 126 expects to depart from their current location obstructing the current path 404, the processor 220 proceeds to block 325. At block 325 the processor 220 can be configured to extend the above-mentioned default timeout period, e.g., by a predetermined factor (e.g., by doubling the default timeout period, although a wide variety of other absolute or fractional adjustments can also be employed). At block 330, the processor 220 can determine, via further sensor data captured via the sensor(s) 140, whether the worker 126 continues to obstruct the current path 404. When the determination at block 330 is negative, the processor 220 is configured to determine whether the extended timeout period has expired at block 340. When the timeout has not yet expired, the processor 220 is configured to continue monitoring sensor data at block 330. In some examples, before the extended timeout period has expired and while monitoring sensor data via block 330, the mobile robot 120 can continue to present the extended timeout period on the display 214, along with the selectable elements 504 and 508. The worker 126 can therefore provide updated instructions to the mobile robot 120, e.g., indicating that the worker 126 no longer expects to depart shortly. In that case, the mobile robot 120 may proceed to block 345, as would occur following a determination at block 320 that the obstacle is expected to remain in place. In further examples, repeated selection of the element 508 can further extend the timeout period.

When the determination at block 330 is affirmative, the processor 220 can be configured to control the locomotive assembly 204 to continue on the current path 204. When the determination at block 340 is affirmative, indicating that the worker 126 has not vacated the current path 404, the processor 220 is configured to generate a new path at block 345, to travel to the target location 408 while avoiding the worker 126. As will be apparent, when the updated status data received at block 320 is accurate, the robot 120 may therefore delay the generation of a new path and in doing so arrive at the target location 408 sooner than by generating a new path.

Figure 6:
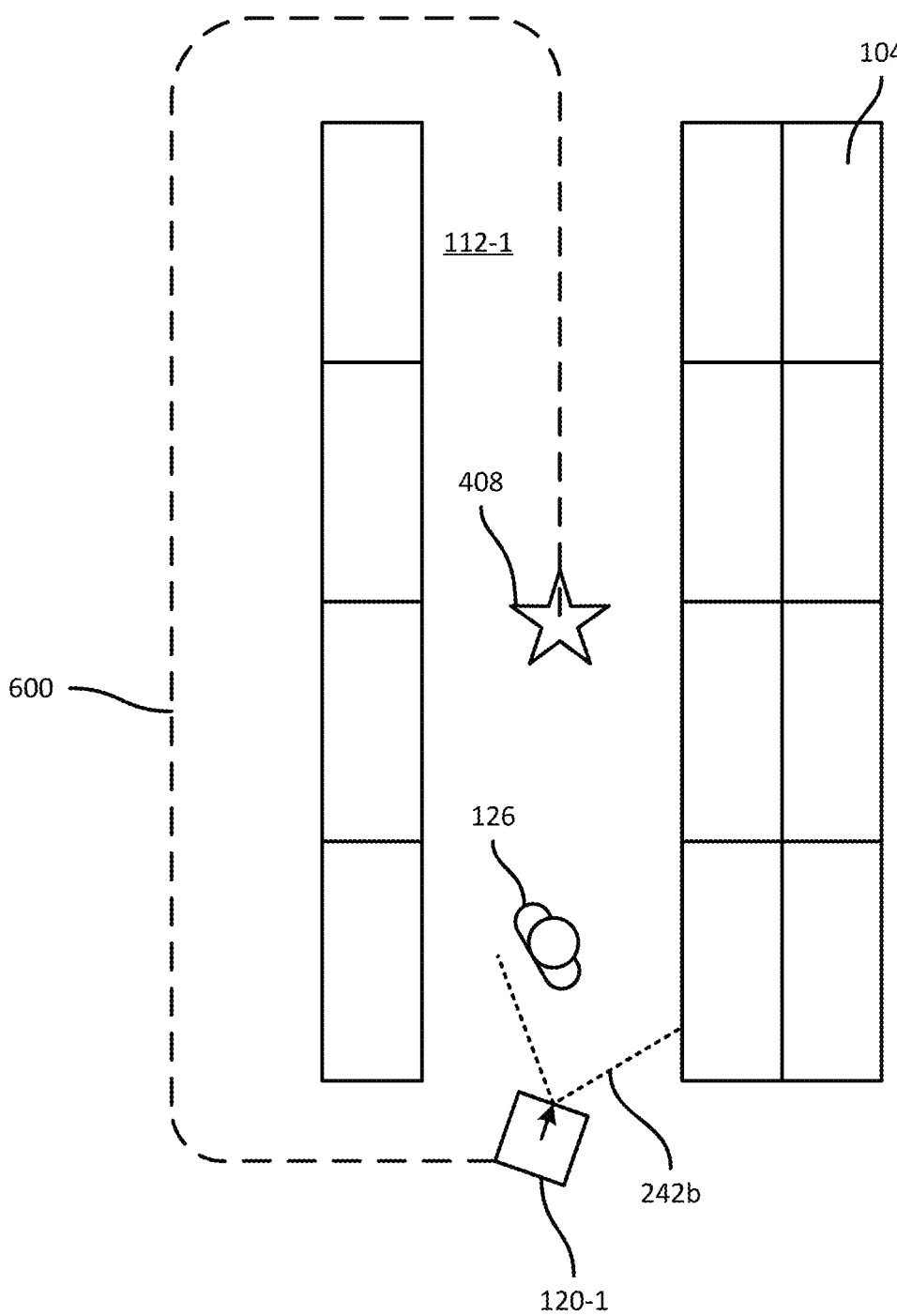
FIG. 6 is a diagram illustrating an example performance of block 345 of the method of FIG. 3.

In response to updated status data indicating that the worker 126 expects to remain in the location shown in FIG. 4 (e.g., when the response 508 is selected by the worker 126), the processor 220 proceeds from block 320 to block 345 and generates a new path, bypassing the timeout period. In other words, the robot 120 may reduce the total travel time to the target location in comparison with a scenario in which no updated status data is received, by bypassing the timeout period. FIG. 6 illustrates an example performance of block 345, in which the processor 220 generates a new path 600 to the target location 408 that circumvents the worker 126, e.g., by travelling through an adjacent aisle 112.

As will be apparent from the discussion above, the generation of a request at block 315 and the receipt of updated status data at block 320 can also be performed for an obstacle in the form of another mobile robot. In such examples, the request can be outputted via the communications interface 228 rather than the display 214, and the updated status data can be received via the communications interface 228 rather than via a touch screen, microphone, or the like.

As noted previously, the method 300 can be performed by the robot 120 to select navigational actions upon encountering various types of obstacles, in various states. In a further example illustrated in FIG. 7, the mobile robot 120 detects, at block 310, an obstacle 700 such as a box, pallet, or the like obstructing the current path 404. The obstacle 700, in other words, is not self-propelled, i.e., is unable to effect a status change itself or respond to requests generated at block 315 by the mobile robot 120. The mobile robot 120 can therefore, at block 315, select a request to render (e.g., by rendering on the display 214) that requests a status change for the obstacle 700 from an assisting entity distinct from the obstacle 700. For example, the worker 126 in the aisle 112-1 may view the request on the display 214 and provide updated status data to the robot 120, and optionally manipulate the obstacle 700.

Figure 7:
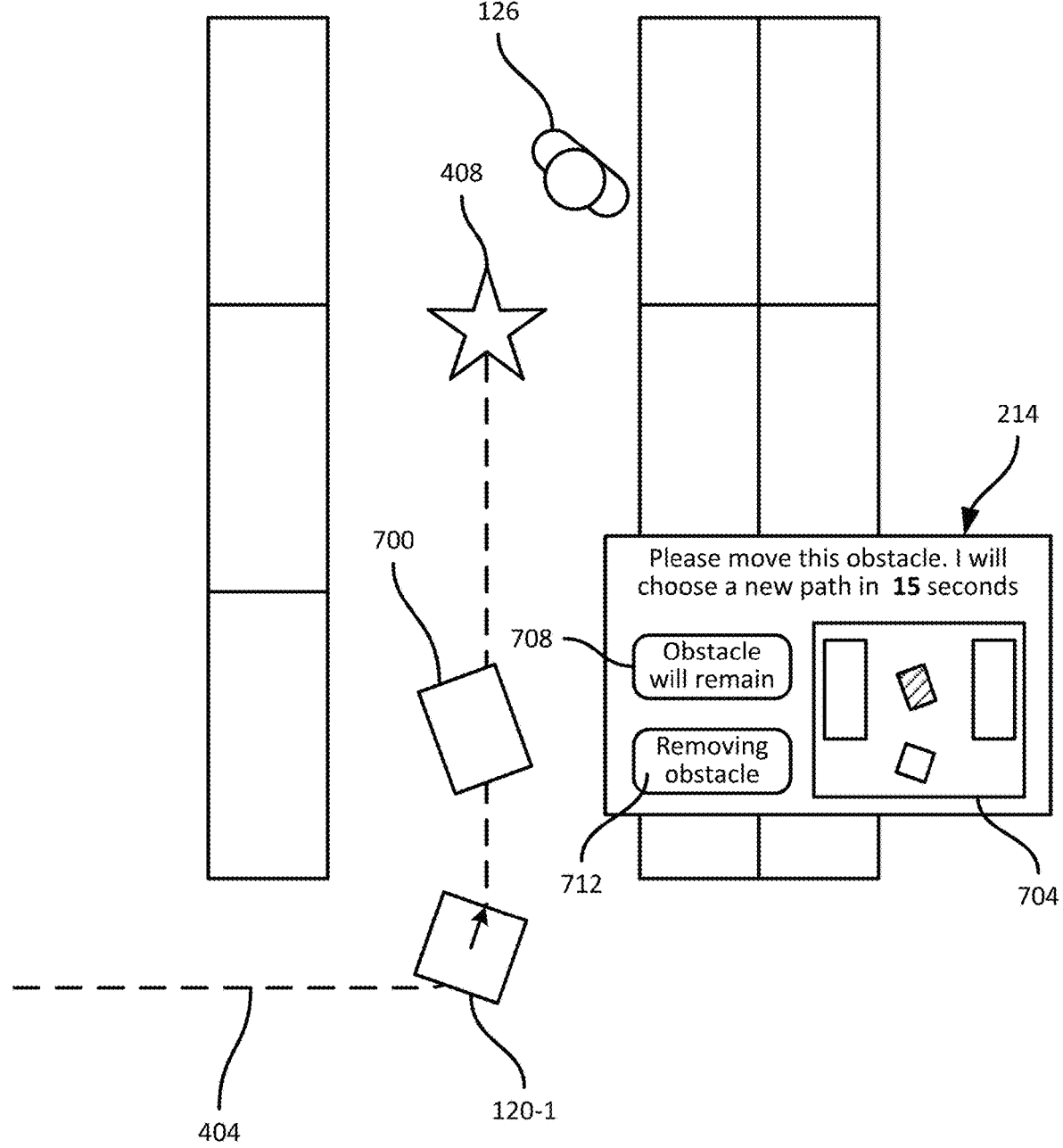
FIG. 7 is a diagram illustrating another example performance of blocks 305 to 315 of the method of FIG. 3.

As shown in FIG. 7, the request presented on the display 214 includes a request to move the obstacle 700, and can include an indication of the current timeout period as noted above. The request can also include, in this example, a map 704 depicting a portion of the aisle to illustrate the position of the obstacle (hatched) relative to the robot 120 and the support structures 104. The request includes, as discussed in connection with FIG. 5, responses 708 and 712 that are selectable by the worker 126. Selection of the response 708 provides updated status data to the robot 120 indicating that the obstacle 700 is expected to continue obstructing the current path 404. The robot 120 can therefore proceed to block 345 and generate a new path, bypassing the timeout period. The worker 126 may select the response 708, for example, when the obstacle 700 is too heavy to move, or when other operations in the facility 100 require the presence of the obstacle 700.

Selection of the response 712 provides updated status data to the robot 120 indicating that the obstacle 700 is expected to be removed from the current path 404 shortly. The robot 120 therefore proceeds to block 325, extending the timeout period and monitoring sensor data for departure of the obstacle 700 from the current path, as discussed above in connection with FIG. 5.

In further examples, the request generated at block 315 prompts a nearby assisting entity (e.g., the worker 126 or another mobile robot 120) for updated status data indicating the current presence or absence of an obstacle, rather than an expected presence or absence as discussed above. In cases such as those shown in FIGS. 5-7, the current presence or absence of obstacles can be detected directly from sensor data captured at block 310. In other cases, however, a previously detected obstacle is outside the FOV 242 of the sensor(s) 240, and the obstacle's current presence cannot be directly detected.

Figure 8:
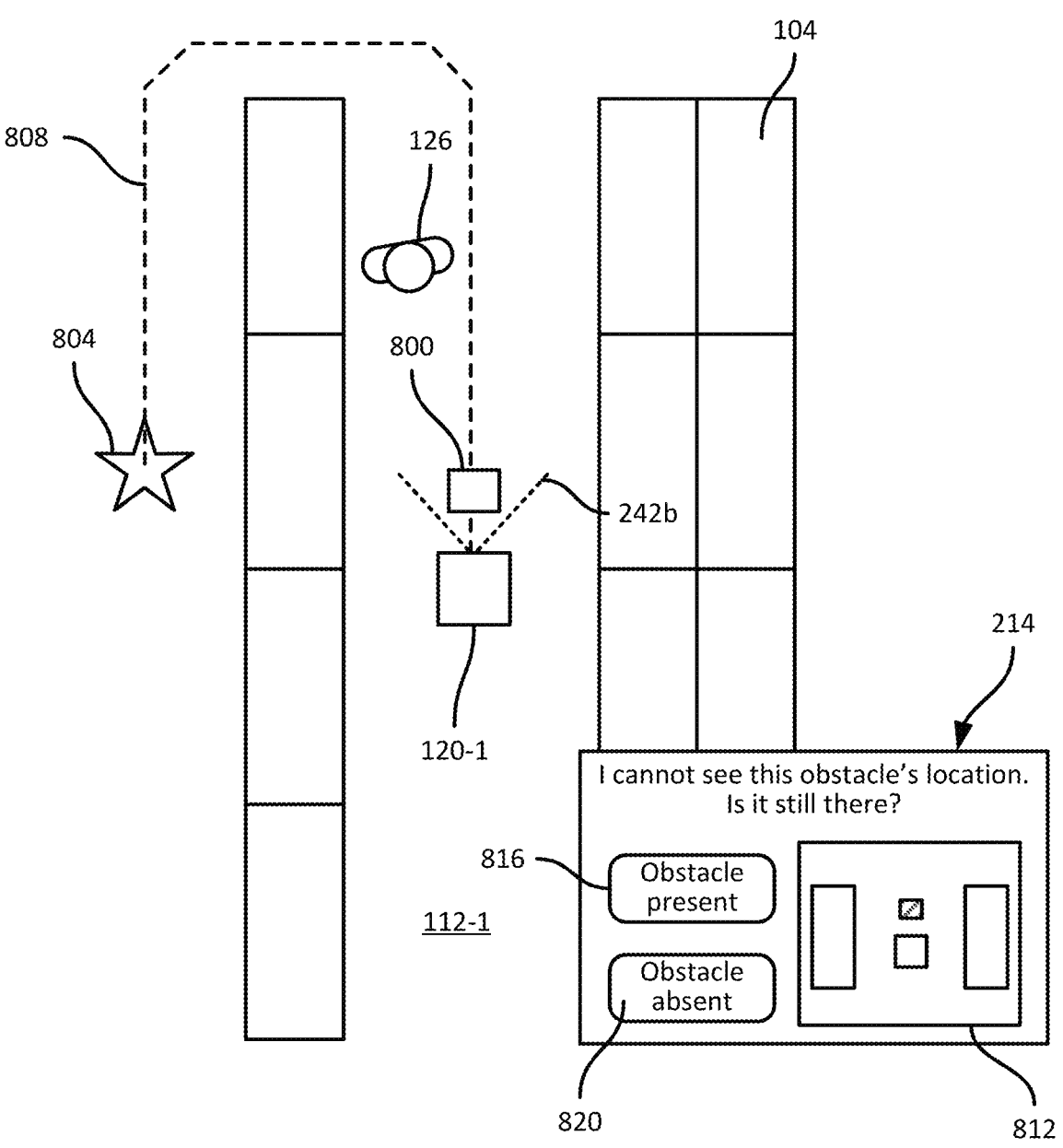
FIG. 8 is a diagram illustrating a further example performance of blocks 305 to 315 of the method of FIG. 3.
Figure 9:
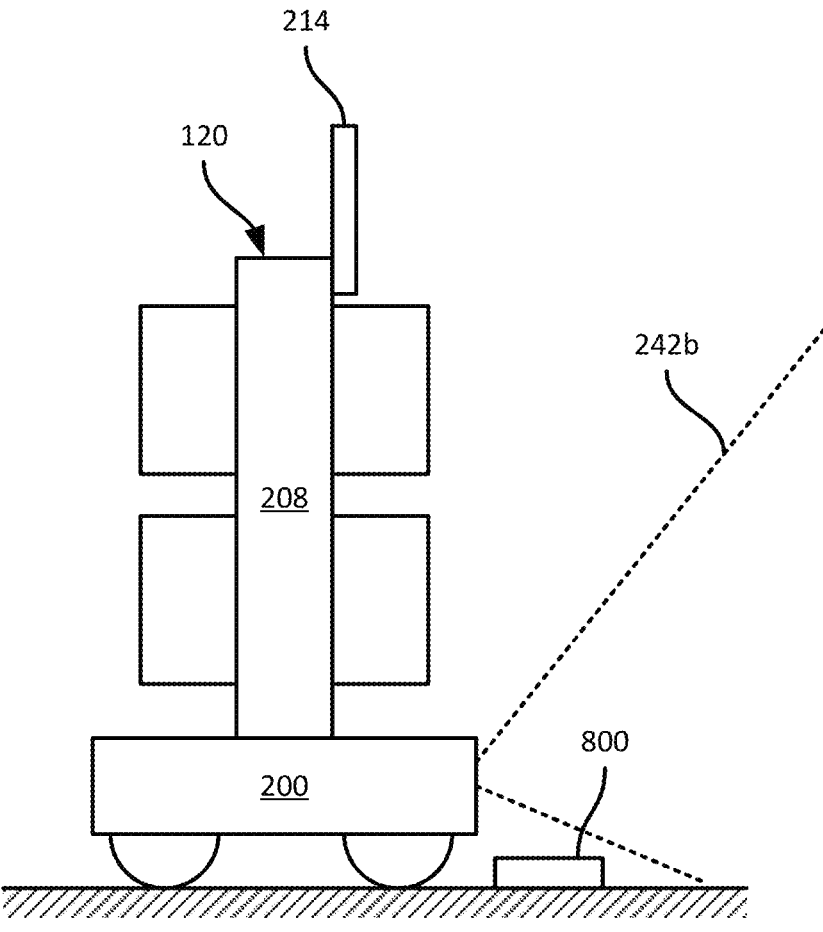
FIG. 9 is a diagram illustrating an unobservable obstacle adjacent to the mobile robot 120 of FIG. 1.

FIG. 8 illustrates a further example in which, while travelling to the current location of the robot 120 (i.e., the target location 408 discussed earlier), the robot 120 detected an obstacle 800. Having been assigned a new target location 804 and generated a current path 808, however, the robot 120 can no longer observe the obstacle 800, e.g., because the obstacle 800 is a low-lying obstacle that falls below the lower extent of the sensor FOVs 242. Turning briefly to FIG. 9, a side view of the robot 120 is shown along with the obstacle 800, illustrating that the obstacle 800 is outside the FOV 242*b*. The obstacle 800, in other words, may remain in an obstacle map stored by the robot 120, but cannot be directly observed by the robot 120. The robot 120 may therefore be unable to proceed along the current path 808, and in some cases may also be prevented from executing a new path because of the close proximity of the obstacle 800 to the chassis 200.

The robot 120 is therefore configured, at block 315, to generate a further request type, e.g., on the display 214 (or transmitted wirelessly to other robots 120), requesting that an assisting entity provide updated status data indicating a current presence of the obstacle 800. In particular, the request can include a map 812 similar to the map 704 discussed in connection with FIG. 7, as well as a selectable option 816 for indicating that the obstacle 800 is still present, and a selectable option 820 for indicating that the obstacle 800 is absent. When the option 820 is selected, the robot 120 can proceed directly to block 335, omitting blocks 325 and 330. When the option 816 is selected, the robot 120 can proceed to block 345. In some cases, however, the robot 120 may first proceed to block 350 and generate a request for assistance. The request for assistance can include a request to move the unobservable obstacle 800, and/or to push the robot 120 itself until the obstacle 800 is within the sensor FOVs 242. In some examples, following the request for assistance at block 350, the mobile robot 120 may resume execution of the path from block 305, e.g., if the assistance requested is to remove an obstacle or reposition the mobile robot 120 to enable continued navigation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
capturing sensor data representing a vicinity of a mobile robot;
detecting, based on the sensor data, an obstacle obstructing a current path of the mobile robot;
in response to detecting the obstacle, outputting a request for a status change corresponding to the obstacle, the request including selectable responses to the request indicating an expected status of the obstacle and a default timeout period for selecting one of the responses after which a new path circumventing the obstacle will be generated;
receiving, in response to the request for the status change, data defining an updated status of the obstacle;
selecting, based on the updated status data, a navigational action between (i) continuing to travel according to the current path and (ii) generating a new path circumventing the obstacle; and
executing the selected navigational action.

2. The method of claim 1, wherein the data defining the updated status of the obstacle includes one of (i) an indication that the obstacle is expected to continue obstructing the current path, and (ii) an indication that the obstacle is expected to vacate the current path.

3. The method of claim 2, wherein selecting the navigational action includes:
selecting continuing to travel according to the current path when the updated status data includes the indication that the obstacle is expected to vacate the current path; and
selecting generating a new path circumventing the obstacle when the updated status data includes the indication that the obstacle is expected to continue obstructing the current path.

4. The method of claim 1, wherein executing continued travel according to the current path includes determining whether the obstacle has vacated the current path within a second timeout period.

5. The method of claim 4, wherein executing continued travel according to the current path includes generating the timeout period by extending the default timeout period.

6. The method of claim 1, wherein executing the generation of the new path circumventing the obstacle includes bypassing the default timeout period and generating the new path.

7. The method of claim 1, wherein detecting the obstacle includes:
determining that a location of a previously detected obstacle is outside field of view of the sensor; and
wherein the request for the status change includes a request for data indicating that the previously detected obstacle is (i) present at the location, or (ii) absent from the location.

8. The method of claim 7, further comprising, prior to generating the new path circumventing the obstacle:
when the updated status data indicates that the detected obstacle is present at the location, generating a second request for an assisting entity to push the mobile robot.

9. The method of claim 1, wherein the request for the status change includes a request for an assisting entity to move the obstacle out of the current path.

10. The method of claim 1, wherein detecting the obstacle includes determining that the obstacle is self-propelled; and
wherein the request for the status change includes a request directed to the obstacle to move out of the current path.

11. The method of claim 10, wherein detecting the obstacle includes determining that the obstacle is one of (i) a human, and (ii) another mobile robot.

12. The method of claim 1, wherein outputting the request includes rendering the request on a display of the mobile robot.

13. The method of claim 1, wherein the request includes a graphical indication of a location of the obstacle.

14. A mobile robot, comprising:
a locomotive assembly;
an output device; and
a processor configured to:
control the locomotive assembly to travel according to a current path;
capture sensor data representing a vicinity of the mobile robot;
detect, based on the sensor data, an obstacle obstructing the current path;
in response to detecting the obstacle, control the output device to present a request for a status change corresponding to the obstacle, the request including selectable responses to the request indicating an expected status of the obstacle and a default timeout period for selecting one of the responses after which a new path circumventing the obstacle will be generated;
receive, in response to the request for the status change, data defining an updated status of the obstacle;
select, based on the updated status data, a navigational action between (i) continuing to travel according to the current path and (ii) generating a new path circumventing the obstacle; and
execute the selected navigational action.

15. The mobile robot of claim 14, wherein the data defining the updated status of the obstacle includes one of (i)

an indication that the obstacle is expected to continue obstructing the current path, and (ii) an indication that the obstacle is expected to vacate the current path.

16. The mobile robot of claim 15, wherein the processor is configured to select the navigational action by:

selecting continuing to travel according to the current path when the updated status data includes the indication that the obstacle is expected to vacate the current path; and selecting generating a new path circumventing the obstacle when the updated status data includes the indication that the obstacle is expected to continue obstructing the current path.

17. The mobile robot of claim 14, wherein the processor is configured to execute continued travel according to the current path by determining whether the obstacle has vacated the current path within a second timeout period.

18. The mobile robot of claim 17, wherein the processor is configured to execute continued travel according to the current path by generating the second timeout period by extending the default timeout period.

19. The mobile robot of claim 14, wherein the processor is configured to execute the generation of the new path circumventing the obstacle by bypassing the default timeout period and generating the new path.

20. The mobile robot of claim 14, wherein the processor is configured to detect the obstacle by:

determining that a location of a previously detected obstacle is outside of a field of view of the sensor; and wherein the request for the status change includes a request for data indicating that the previously detected obstacle is (i) present at the location, or (ii) absent from the location.

21. The mobile robot of claim 20, wherein the processor is further configured, prior to generating a new path circumventing the obstacle, to:

when the updated status data indicates that the detected obstacle is present at the location, generate a second request for an assisting entity to push the mobile robot.

22. The mobile robot of claim 14, wherein the request for the status change includes a request for an assisting entity to move the obstacle out of the current path.

23. The mobile robot of claim 14, wherein the processor is configured to detect the obstacle by determining that the obstacle is self-propelled; and wherein the request for the status change includes a request directed to the obstacle to move out of the current path.

24. The mobile robot of claim 23, wherein the processor is configured to detect the obstacle by determining that the obstacle is one of (i) a human, and (ii) another mobile robot.

25. The mobile robot of claim 14, wherein the request includes an electronic message exchange with the obstacle.

26. The mobile robot of claim 14, wherein the request includes a graphical indication of a location of the obstacle.

\* \* \* \* \*